(12) United States Patent
Shigemitsu et al.

(10) Patent No.: US 9,336,424 B2
(45) Date of Patent: May 10, 2016

(54) BARCODE READER, BARCODE READING METHOD, AND BARCODE READING PROGRAM

(71) Applicant: NEC Platforms, Ltd., Kawasaki-shi, Kanagawa (JP)

(72) Inventors: Hiroshi Shigemitsu, Kawasaki (JP); Masao Gotoh, Kawasaki (JP); Hiroshi Tsuruki, Kawasaki (JP); Masato Teraoka, Kawasaki (JP)

(73) Assignee: NEC PLATFORMS, LTD, Kawasaki (JP)

( * ) Notice: Subject to any disclaimer, the term of this patent is extended or adjusted under 35 U.S.C. 154(b) by 0 days.

(21) Appl. No.: 14/427,681

(22) PCT Filed: Nov. 18, 2013

(86) PCT No.: PCT/JP2013/081015
§ 371 (c)(1),
(2) Date: Mar. 12, 2015

(87) PCT Pub. No.: WO2014/091880
PCT Pub. Date: Jun. 19, 2014

(65) Prior Publication Data
US 2015/0278568 A1    Oct. 1, 2015

(30) Foreign Application Priority Data
Dec. 12, 2012 (JP) ................. 2012-271513

(51) Int. Cl.
*G06K 5/04* (2006.01)
*G06K 7/10* (2006.01)
(Continued)

(52) U.S. Cl.
CPC ........ *G06K 7/10792* (2013.01); *G06K 7/10821* (2013.01); *G06K 7/1478* (2013.01)

(58) Field of Classification Search
USPC .......................... 235/462.01, 462.08, 462.25
See application file for complete search history.

(56) References Cited

U.S. PATENT DOCUMENTS 4,125,765 A * 11/1978 Cowardin .......... G06K 7/10881
235/462.08
6,367,698 B1 * 4/2002 Yamamoto ......... G06K 7/10851
235/462.11
6,371,373 B1 * 4/2002 Ma ........................... G06K 7/14
235/456

(Continued)

FOREIGN PATENT DOCUMENTS

CN      1776708 A      5/2006
JP    05-290201 A    11/1993

(Continued)

OTHER PUBLICATIONS

International Search Report for PCT Application No. PCT/JP2013/081015, mailed on Dec. 10, 2013.

(Continued)

*Primary Examiner* — Tuyen K Vo

(57) ABSTRACT

There is provided a barcode reader that decode of a barcode is possible with easy processes even in a case where reflectivity around the barcode is higher than reflectivity at bright portions of the barcode. The barcode reader comprises: an edge deleter configured to delete the position information and polarity information on an unnecessary edge which arises due to a difference between a strength of a reflected light from a quiet zone of the barcode and a strength of a reflected light from an adjacent portion of the quiet zone, wherein, on detecting two successive edges which have the same polarity, the edge deleter determines an edge which is closer to an end portion of a scan as the unnecessary edge and deletes the position information and polarity information on the unnecessary edge.

8 Claims, 10 Drawing Sheets

(51) Int. Cl.
*G06K 9/32* (2006.01)
*G06K 7/14* (2006.01)

(56) References Cited

U.S. PATENT DOCUMENTS

| | | | |
|---|---|---|---|
| 6,739,513 | B1 | 5/2004 | McClellan et al. |
| 2008/0082946 | A1* | 4/2008 | Zilic ............... G06F 17/504 716/103 |
| 2012/0238048 | A1* | 9/2012 | Yamamoto ............ B23K 26/36 438/57 |

FOREIGN PATENT DOCUMENTS

| | | |
|---|---|---|
| JP | 08-147402 A | 6/1996 |
| JP | 2008-140255 A | 6/2008 |
| JP | 2009-076031 A | 4/2009 |
| JP | 2011-103085 A | 5/2011 |

OTHER PUBLICATIONS

Chinese Office Action for CN Application No. 201380047281.X issued on Sep. 21, 2015. with English Translation.

* cited by examiner

BARCODE READER, BARCODE READING METHOD, AND BARCODE READING PROGRAM

This application is a National Stage Entry of PCT/JP2013/081015 filed on Nov. 18, 2013, which claims priority from Japanese Patent Application 2012-271513 filed on Dec. 12, 2012, the contents of all of which are incorporated herein by reference, in their entirety.

TECHNICAL FIELD

The present invention relates to a barcode reader, a barcode reading method, and a barcode reading program for reading a barcode.

BACKGROUND ART

FIG. 1 is a block diagram of one example of a normal barcode reader. The barcode reader projects light on a barcode, receives reflected light from the barcode and reads the barcode. Specifically, a barcode reading mechanism is as follows. A floodlighting LED 901 projects light on a barcode 903 and concentrates reflected light from the barcode on a CCD (Charge Coupled Device) sensor 907 through a light reception lens 905. Concentrated reflected light is photoelectric-converted with the CCD sensor 907. An amplitude of a reading analog signal, which indicates strength of the reflected light, acquired by the photoelectric-conversion is amplified with an analog amplifier 909, and the amplified analog signal is binarized in a predetermined manner. A digital signal acquired by the binarization is taken in a decoder 911 and decoded by the decoder 911, and thereby data which is encoded in the form of a barcode symbol can be acquired.

Here, the light projected from the floodlighting LED 901 is referred to as scan light. It is referred to as a scan that the scan light is projected on the barcode 903 and the reflected light from the barcode 903 is imaged by an imaging device such as the CCD sensor 907. Here, the scan light may be light which scans the barcode 903 from one end to another end in order according to time or simultaneously.

Meanwhile, in an example illustrated in FIG. 1, a CPU (Central Processing Unit) includes a decoder 911 and a GPIO (General Purpose Input/Output) 913, and the GPIO 913 provides the floodlighting LED 901 with a floodlighting signal. Here, the decoder 911 may be a hardware included in the CPU 915, something like a software which is executed by the CPU 915 reading a program, or a mixture thereof.

CITATION LIST

Patent Literature

{PTL 1} Japanese Patent Application Publication No. 2009-076031

SUMMARY OF INVENTION

Technical Problem

Here, there is a case where a placing surface of an object on which a barcode is placed is white, a bright section of the barcode which is placed on the surface is gray, and a dark section included in the barcode is black. In this case (namely, a case where a reflectivity of the placing surface is higher than a reflectivity of the bright section of the barcode), a normal barcode reader could not read the barcode.

Here, the barcode includes the barcode symbol and quiet zones which exists at both ends of the barcode symbol. The barcode symbol includes white bars and black bars which correspond to a start character, a data character, a check digit, and a stop character. Further, the quiet zones and the white bars constitute the bright section and the black bars constitute the dark section.

Further, "placing" includes pasting, printing and so forth.

For example, FIG. 2A shows one example of a barcode that color of black bars constituting the dark section is black and color of a foundation constituting the bright section is gray as seen above. FIG. 2B shows an analog reading signal wave shape when a normal barcode reader reads the barcode illustrated in FIG. 2A on a white placing surface of the barcode placing object. The normal barcode reader recognizes the maximum electrical potential A as an electrical potential corresponding to a brightness of the bright portion of the barcode, recognizes the minimum electrical potential B as an electrical potential corresponding to a brightness of the dark portion of the barcode, and sets an intermediate electrical potential between the electrical potentials A and B as a threshold. Further, the electrical potential of the analog reading signal is binarized by being compared with the threshold. Therefore, because the binarization is performed after the intermediate electrical potential between the electrical potential A corresponding to white color of the placing surface and the electrical potential B corresponding to black color of the dark portion of the black bars in FIG. 2B is set as the threshold, part of the quiet zones is recognized as black bars. Therefore, data after the binarization does not correspond to a pattern of the barcode, and therefore, it was impossible to decode the barcode normally.

Although FIG. 2 shows a case where a length of the quiet zone of the barcode is shorter than regulations, much the same is true on a case where the length of the quiet zone satisfies the regulations and it is impossible to decode the barcode normally. Further, FIG. 2 illustrates only a quiet zone before the barcode symbol, but there exists another quiet zone behind the barcode symbol.

PTL 1 discloses an optical information reading device that decode is possible in a case where a bright portion of a printed barcode is gray and a peripheral area around the barcode is white. However, the invention in PTL 1 must perform a complex process to detect an error that a margin corresponding area (an area which should be recognized as a margin) includes a black area, to reconstruct array data in such a way to restore the margin corresponding area, and to decode the reconstructed array data.

Accordingly, it is an object of the present invention to provide a barcode reader, a barcode reading method, and a barcode reading program that decode of a barcode is possible with easy processes even in a case where reflectivity around the barcode is higher than reflectivity at bright portions of the barcode.

Solution to Problem

According to a first aspect of the present invention, there is provided a barcode reader for reading information indicated by a barcode on the basis of position information and polarity information on a plurality of edges included in a reading signal indicating a strength of a reflected light from the barcode on which a scan light is projected, the barcode reader comprising: an edge deleter configured to delete the position information and polarity information on an unnecessary edge which arises due to a difference between a strength of a reflected light from a quiet zone of the barcode and a strength of a reflected light from an adjacent portion of the quiet zone, wherein, on detecting two successive edges which have the same polarity, the deleter determines an edge which is closer to an end portion of a scan as the unnecessary edge and deletes the position information and polarity information on the unnecessary edge According to a second aspect of the present invention, there is provided a barcode reading method for reading information indicated by a barcode on the basis of position information and polarity information on a plurality of edges included in a reading signal indicating a strength of a reflected light from the barcode on which a scan light is projected, the method comprising: deleting the position information and polarity information on an unnecessary edge which arises due to a difference between a strength of a reflected light from a quiet zone of the barcode and a strength of a reflected light from an adjacent portion of the quiet zone, wherein the deletion of the position information and polarity information on the unnecessary edge is performed by, on detecting two successive edges which have the same polarity, determining an edge which is closer to an end portion of a scan as the unnecessary edge and deleting the position information and the polarity information of the unnecessary edge.

According to a third aspect of the present invention, there is provided a barcode reading program for causing a computer to function as a barcode reader for reading information indicated by a barcode on the basis of position information and polarity information on a plurality of edges included in a reading signal indicating a strength of a reflected light from the barcode on which a scan light is projected, the program causing the computer to function as: an edge deleter configured to delete the position information and polarity information on an unnecessary edge which arises due to a difference between a strength of a reflected light from a quiet zone of the barcode and a strength of a reflected light from an adjacent portion of the quiet zone, wherein, on detecting two successive edges which have the same polarity, the deleter determines an edge which is closer to an end portion of a scan as the unnecessary edge and deletes the position information and polarity information on the unnecessary edge.

Advantageous Effects of the Invention

According to the present invention, it is possible to decode a barcode with easy processes even in a case where reflectivity around the barcode is higher than reflectivity at the bright portion of the barcode.

REFERENCE SIGNS LIST

101: Floodlighting LED
103: Barcode
105: Light reception lens
107: CCD
109: Analog amplifier
111: Decoder
113: GPIO
115: CPU
121: A/D converter
123: Memory
125: Preprocessor

DESCRIPTION OF EMBODIMENTS

Below, an embodiment of the present invention will be described in detail with reference to the figures.

In the present embodiment, above-noted problem can be solved by performing below-noted preprocess after projecting light on the barcode and performing A/D conversion of light reception data.

(1) Difference between adjacent data sampled is calculated.

(2) On the basis of the difference acquired in above (1) and a "±" sign of the difference, "rise" change start points, "descent" change start points, and change end points are searched and determined.

(3) In a case where there are successive "rise" change start points (namely, a case where there is not a "descent" change start point between two "rise" change start points), a former "rise" change start point is deleted. In a case where there are successive "descent" change start points (namely, there is not a "rise" change start point between two "descent" change start points), a former "descent" change start point is deleted.

(4) On the basis of data regarding whether a change start point is the "rise" change start point or the "descent" change start point, it is determined whether a white bar starts or a black bar starts from the change start point. Further, a median point between the "rise" change start point and a subsequent change end point is determined, and a median point between the "descent" change start point and a subsequent change end point is determined. On the basis of a distance between the median point corresponding to the "rise" change start point and the median point corresponding to the "descent" change start point, a bar width is determined.

Figure 3:
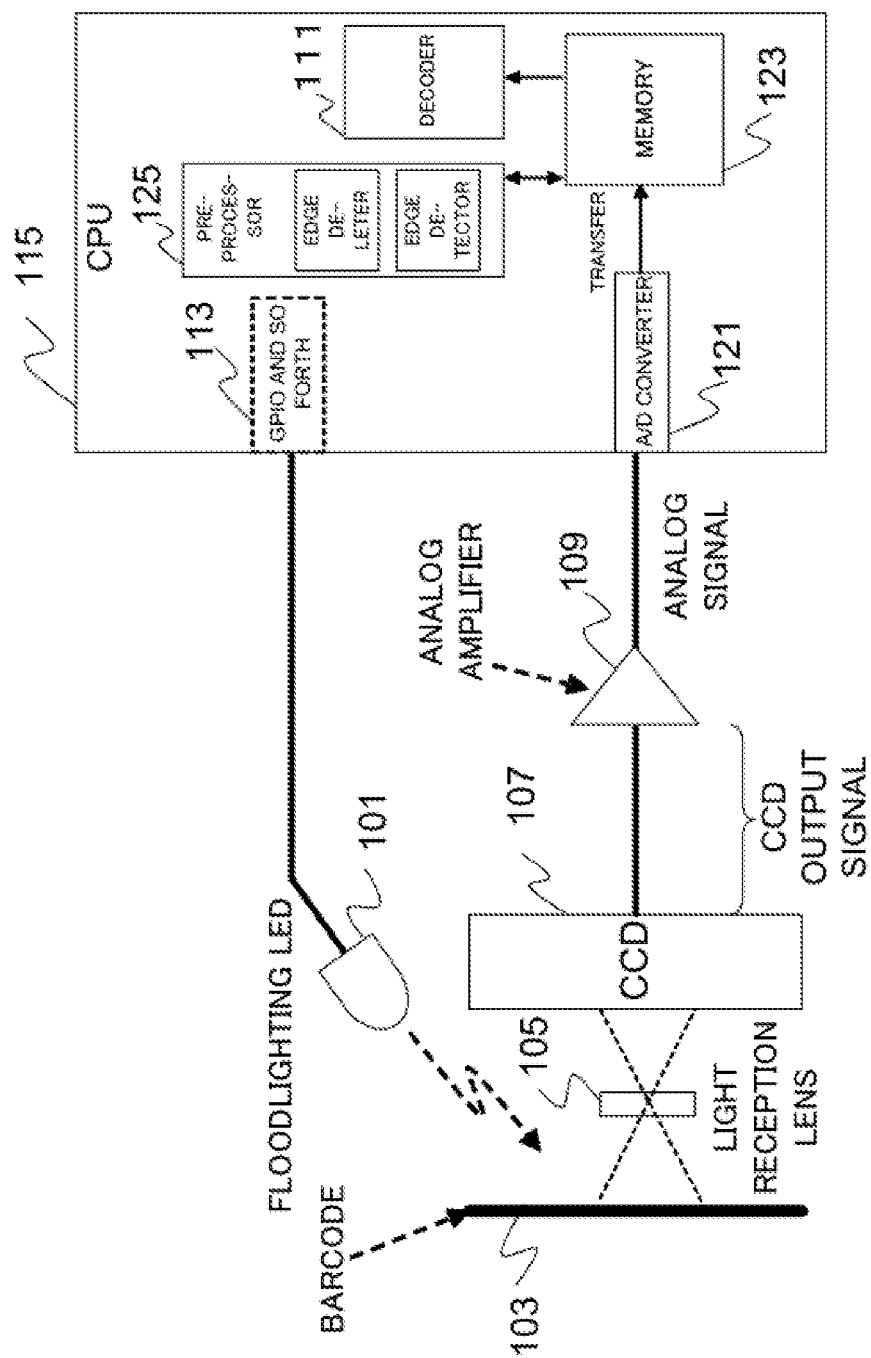
FIG. 3 A conceptual diagram illustrates a configuration of a barcode reader according to the embodiment of the present invention.

FIG. 3 is a conceptual diagram which illustrates the barcode reader according to the present embodiment.

Figure 1:
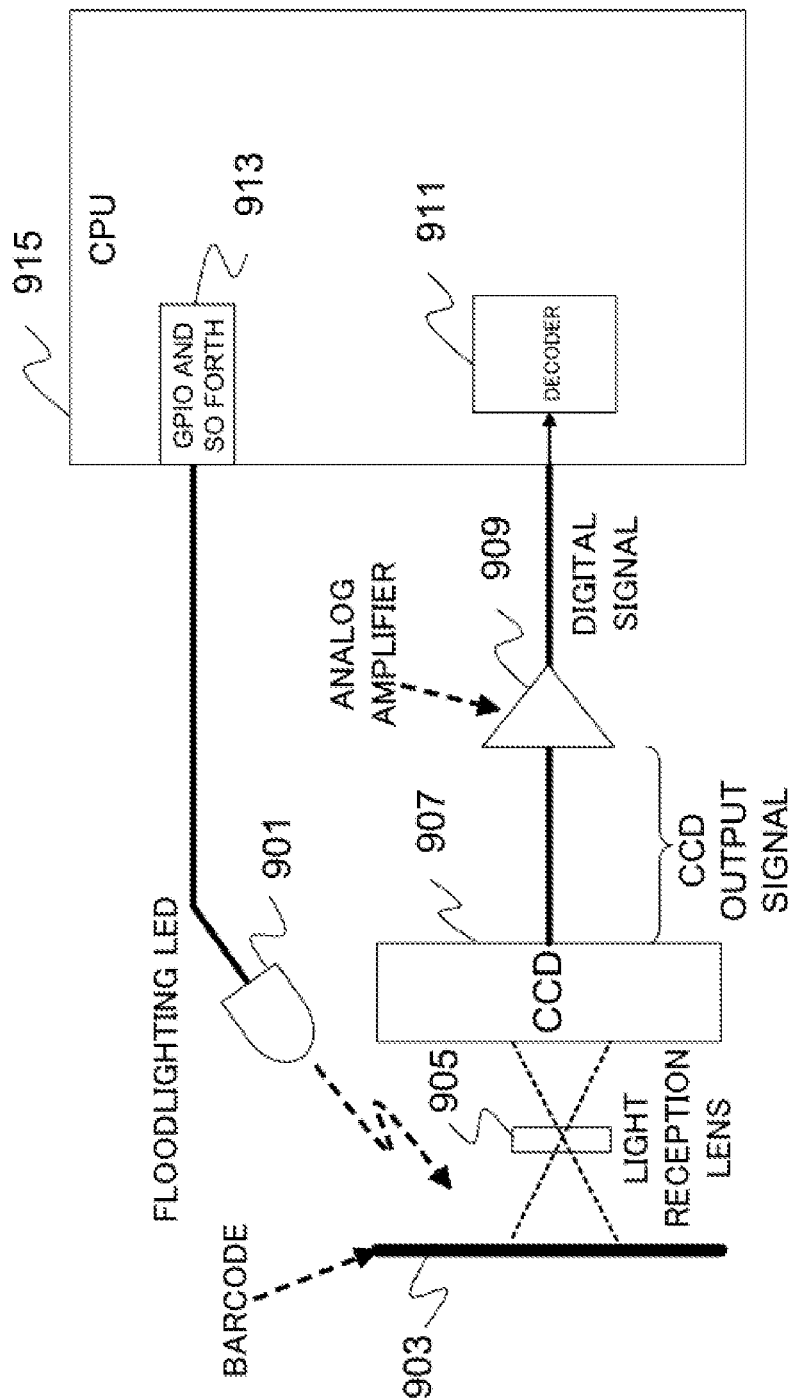
FIG. 1 A conceptual diagram illustrates a configuration of a normal barcode reader.
Figure 2A:
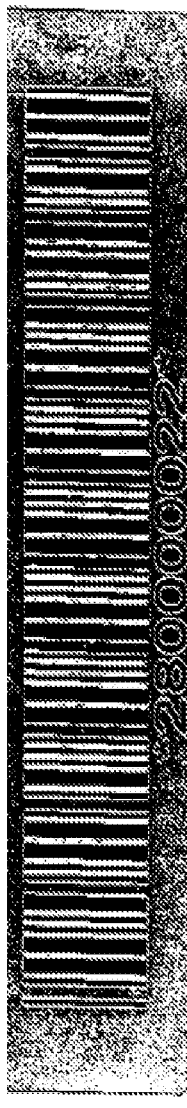
FIG. 2A A figure illustrates one example of a barcode that color of black bars constituting a dark section is black and color of a foundation constituting a bright section is gray as seen above.
Figure 2B:
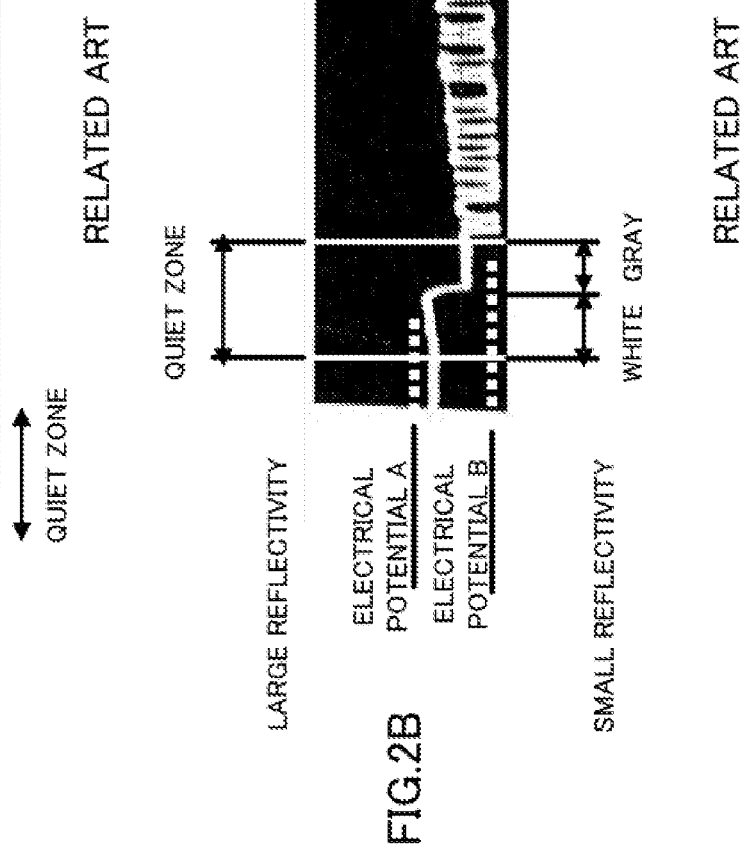
FIG. 2B A figure illustrates a wave shape of an analog reading signal when a normal barcode reader reads the barcode illustrated in FIG. 2A on a white placing surface of a barcode placing object.

A floodlighting LED 101, a barcode 103, a light reception lens 105, a CCD 107, an analog amplifier 109 and a GPIO 113 illustrated in FIG. 3 are respectively similar to the floodlighting LED 901, the barcode 903, the light reception lens 905, the CCD 907, the analog amplifier 909 and the GPIO 913 illustrated in FIG. 1. Therefore, duplicate explanations regarding these are omitted.

The difference between the barcode reader according to the present embodiment and the normal barcode reader is a point below. Namely, the difference is a point that an A/D converter 121, a memory 123 and a preprocessor 125 are added into between the analog amplifier 109 and the decoder 111. Further, the decoder 111 is not similar to the decoder 911.

The A/D converter 121 converts a reading analog signal which is supplied from the CCD sensor 107 and amplified with the analog amplifier 109 into input data being a digital signal. In more detail, the A/D converter (Analog-to-Digital Converter) 121 converts a reading analog signal supplied from the analog amplifier 109 into a digital signal which has a predetermined sampling rate and a predetermined bit number, and each sample of this digital signal is each input data.

The memory 123 stores each input data which is A/D-converted at the A/D converter 121 corresponding to one scan once.

The preprocessor 125 performs a predetermined process (described later) and generates data indicating whether each bar is a black bar or a whiter bar and data indicating each bar's width. These data are supplied to the decoder 111.

Meanwhile, in FIG. 3, the CPU 115 includes the A/D converter 121, the memory 123, the preprocessor 125 and the decoder 111. Each of the A/D converter 121, the preprocessor 125 and the decoder 111 may be hardware included in the CPU 115, something like software which are executed by the CPU 915 reading a program, or a mixture thereof.

Further, part or all of the A/D converter 121, the memory 123, the preprocessor 125 and the decoder 111 may be placed not inside the CPU 115 but outside the CPU and controlled by the CPU.

Figure 5:
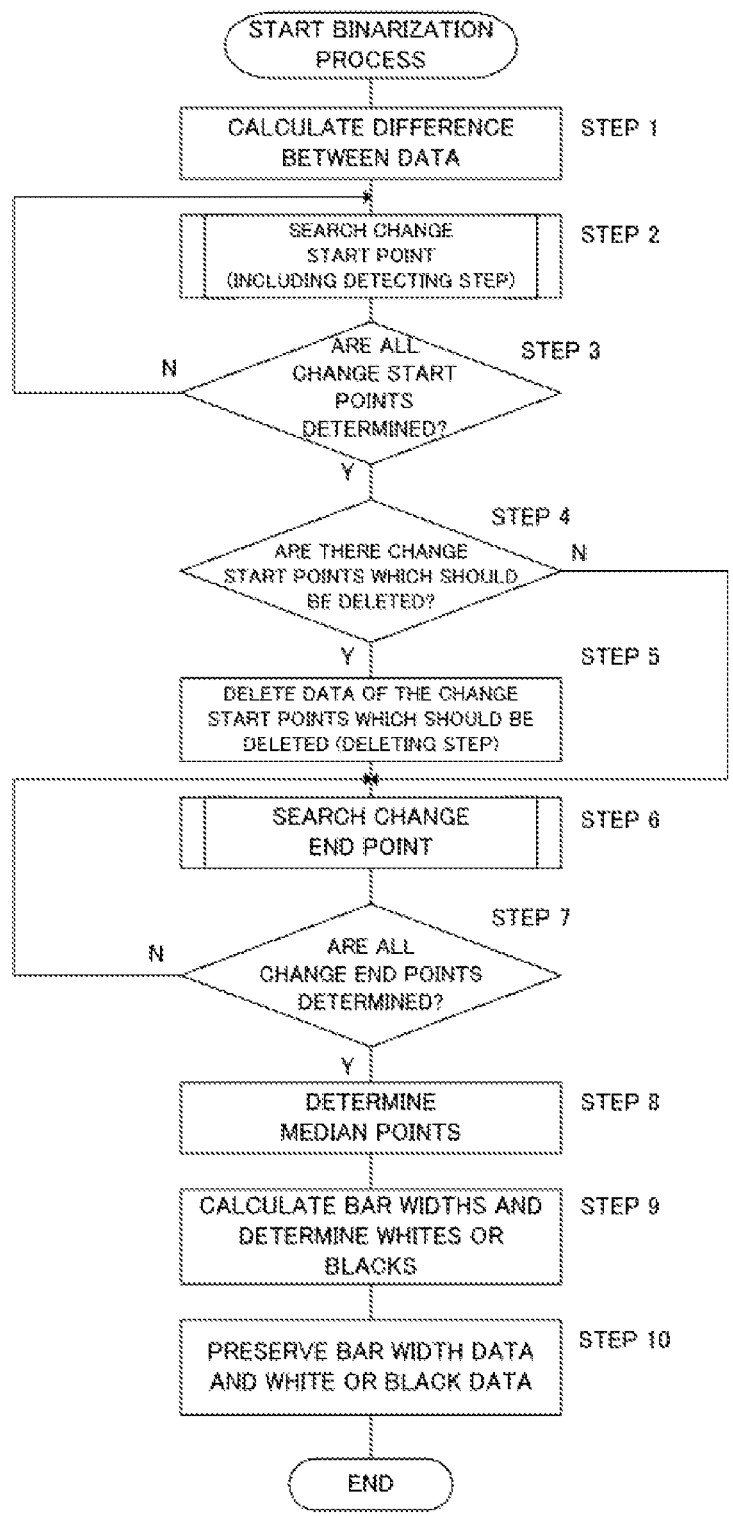
FIG. 5 A flowchart illustrates a flow of process performed by a preprocessor according to the embodiment of the present invention.
Figure 6:
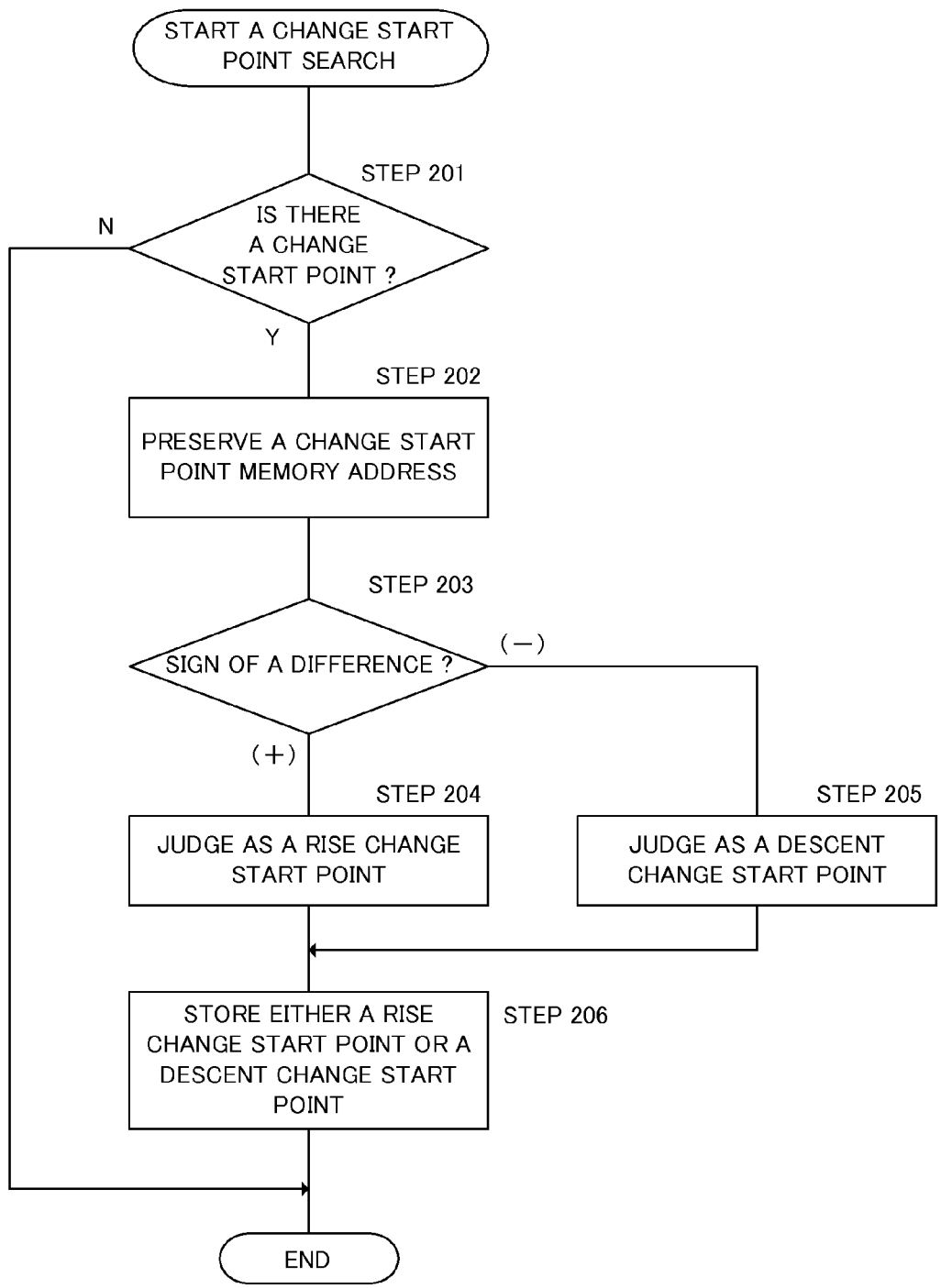
FIG. 6 A flowchart illustrates a detailed flow of a change start point search process in the flow of FIG. 5.
Figure 7:
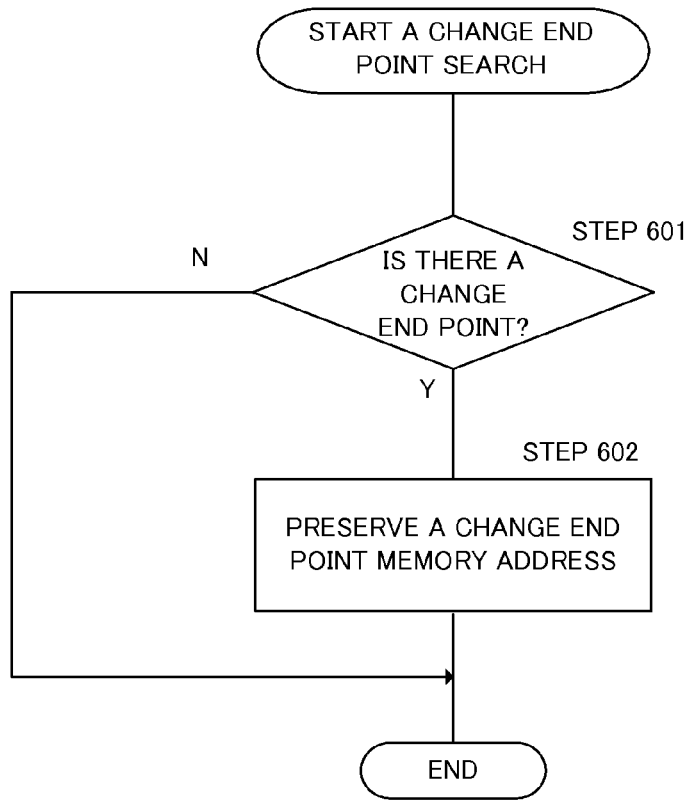
FIG. 7 A flowchart illustrates a detailed flow of a change end point search process in the flow of FIG. 5.
Figure 8:
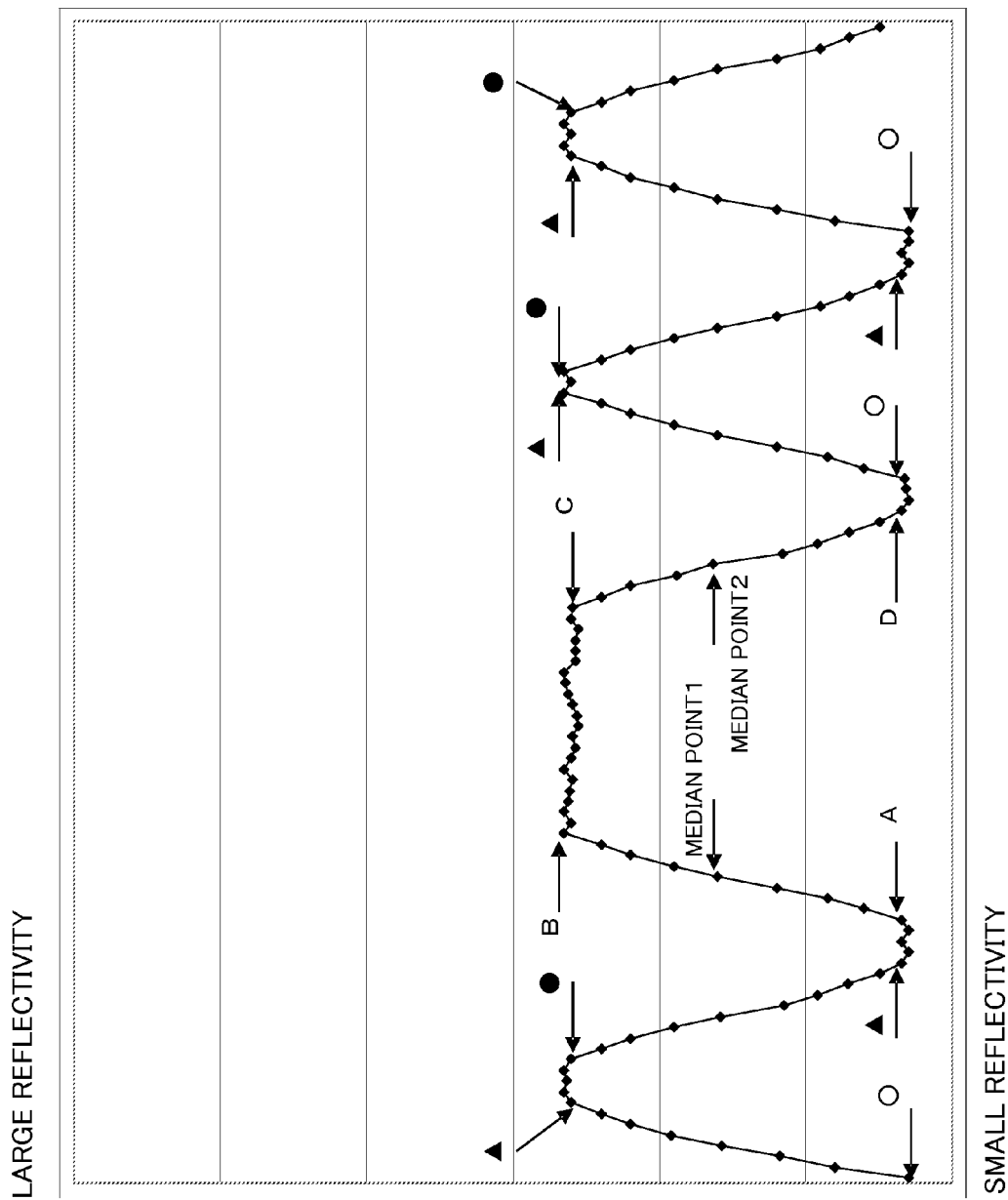
FIG. 8 A wave shape figure illustrates a reading analog signal wave shape of a portion where black bars and white bars are located continuously in alternation and a barcode reading method for reading the barcode from the analog signal wave shape according to the embodiment of the present invention.
Figure 9:
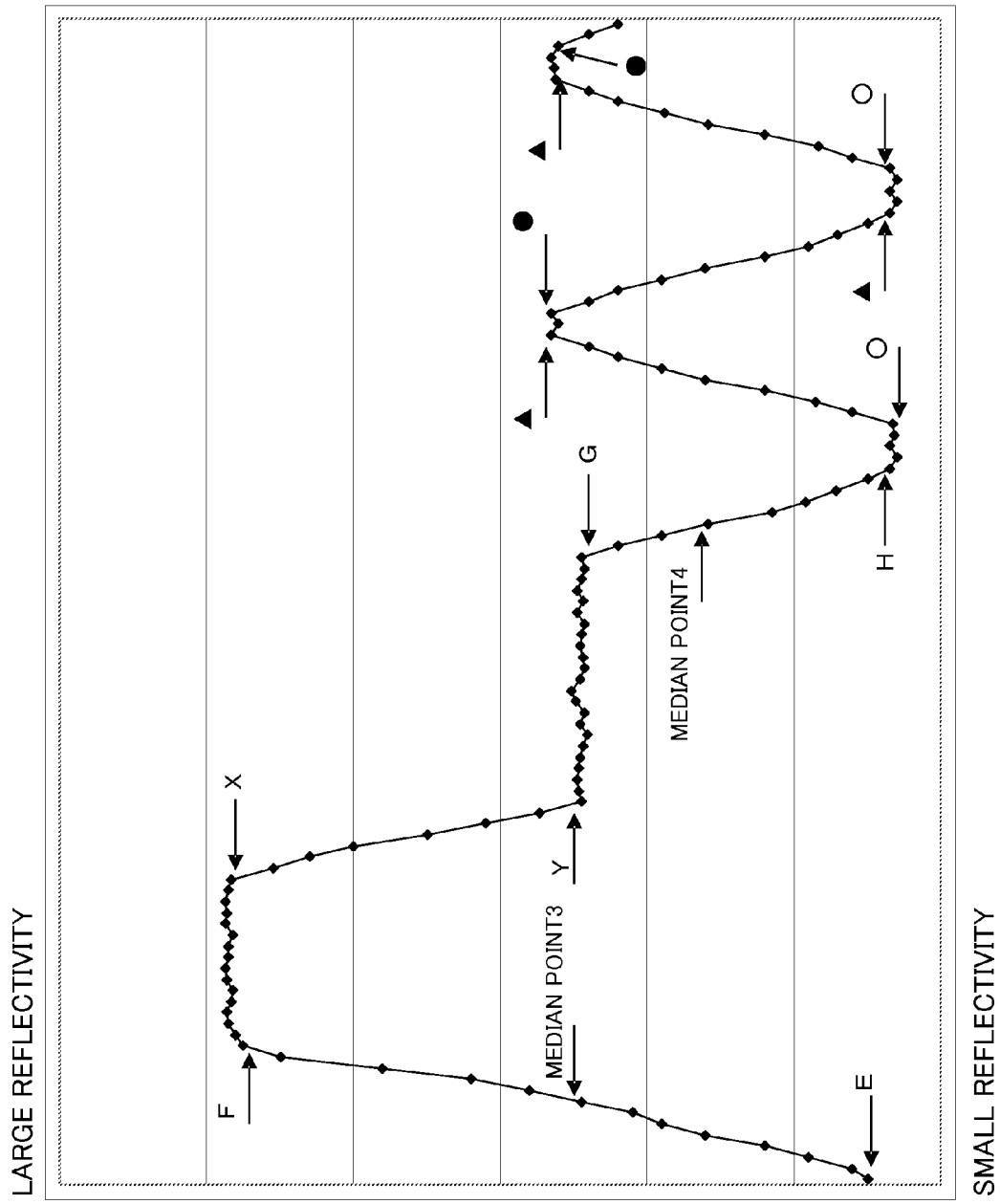
FIG. 9 A wave shape figure illustrates a wave shape of a quiet zone and an adjacent portion thereof of a barcode and a barcode reading method for reading a barcode from the wave shape according to the embodiment of the present invention.

FIG. 5 is the flowchart which illustrates the flow of process performed at the preprocessor 125. FIG. 6 is the flowchart which illustrates the detailed flow of the change start point search process in the flow of FIG. 5. FIG. 7 is the flowchart which illustrates the detailed flow of the change end point search process in the flow of FIG. 5. FIG. 8 is the wave shape figure which illustrates the reading analog signal wave shape of the portion where black bars and white bars are located successively in alternation and so forth. FIG. 9 is the wave shape figure indicating the wave shape of the quiet zone and the adjacent portion thereof of the barcode and so forth.

Next, referring to FIGS. 5 to 7, a process performed at the preprocessor 125 is explained.

Figure 4:
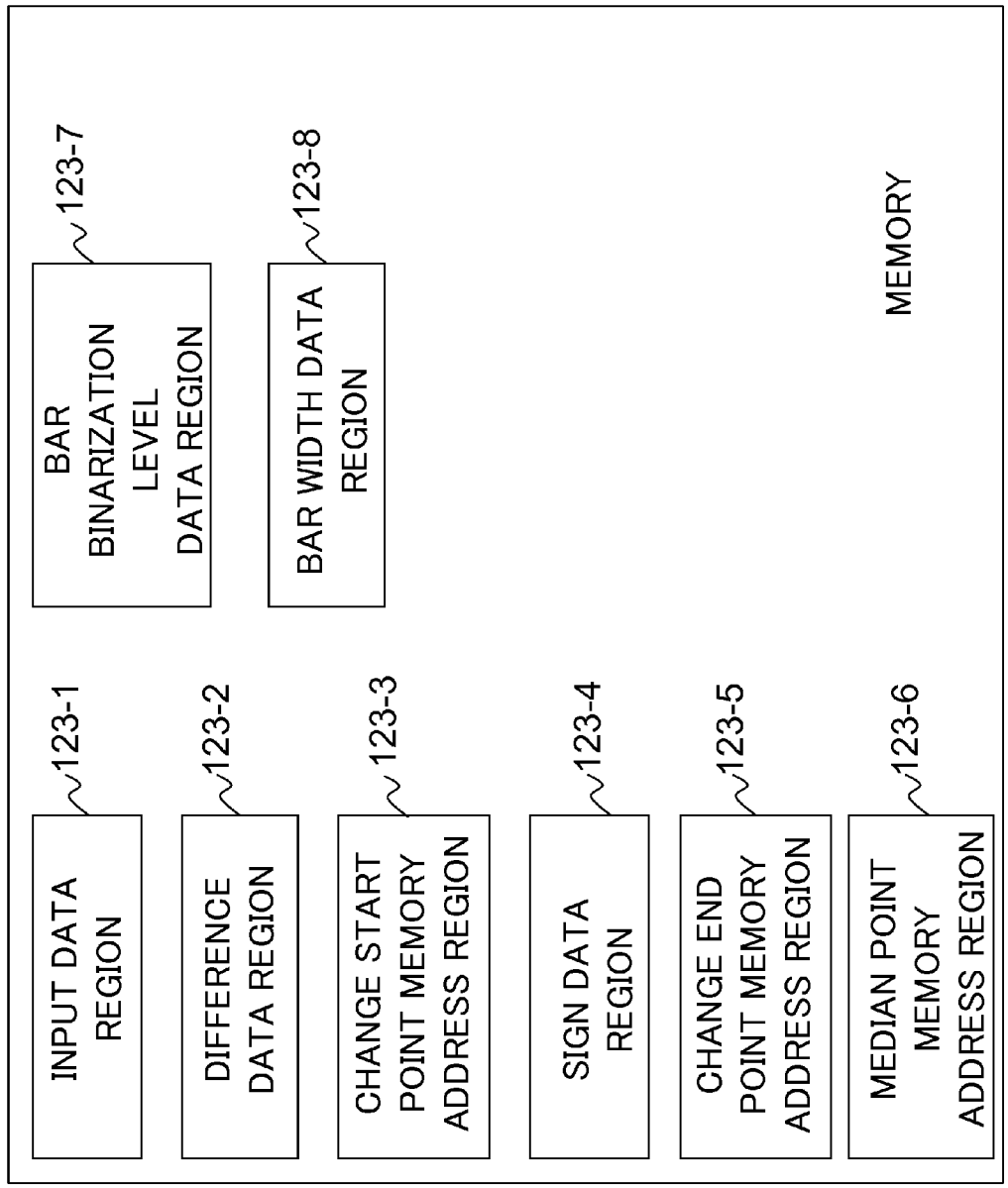
FIG. 4 A figure illustrates a region group of the memory illustrated in FIG. 3.

When input data corresponding to one scan acquired by projecting light on the barcode and receiving the reflected light (scanning the barcode) and A/D converting the analog reading signal indicating a light reception strength is stored in an input data region 123-1 in the memory 123 (FIG. 4), below process is performed.

(1) A difference between mutually adjacent data (namely, mutually adjacent sample data) is calculated (STEP 1). In more detail, with respect to all of input data corresponding to one scan stored in the input data region 123-1 in the memory 123, the difference between the input data themselves and their adjacent data are calculated. Namely, difference data between input data stored at n-th address and input data stored at n+1-th address included in the input data region 123-1 in the memory 123 are calculated and the difference data are stored at n-th address included in a difference data region 123-2 in the memory 123.

(2) All change start points are searched and determined (STEP 2 and STEP 3).

(2-1) It is searched whether there is a change start point (STEP 201). In more detail, in a case where an absolute value of difference data between input data themselves and immediately before input data (difference data which correspond to the immediately before input data and are stored in the difference data region 123-2 in the memory 123) is less than a predetermined value and an absolute value of a difference between the input data themselves and immediately after input data (difference data which corresponds to the input data themselves and are stored in the difference data region 123-2 in the memory 123) is equal to or more than a predetermined value, an address where the input data themselves exists is determined as a change start point memory address corresponding to the change start point.

(2-2) The change start point memory address corresponding to the change start point is stored within a change start point memory address region 123-3 in the memory 123 (STEP 202).

(2-3) A "±" sign of the difference indicated by the difference data stored at the change start point memory address in the difference data region 123-2 is confirmed (STEP 203).

(2-4) If the "±" sign of the difference is plus, the change start point is judged as the "rise" change start point (STEP 204). If the "±" sign of the difference is minus, the change start point is judged as the "descent" change start point (STEP 205).

(2-5) Sign data indicating whether the change start point is the "rise" change start point or the "descent" change start point is stored within a sign data region 123-4 in the memory 123. For example, the sign data indicating whether the change start point is the "rise" change start point or the "descent" change start point is stored within the sign data region 123-4 in such a way to be associated with the change start memory address stored within the change start point region in the memory 123.

(3) It is confirmed whether or not there exists a change start point which should be deleted (STEP 4). In more detail, it is confirmed whether or not there exist successive "rise" change start points and whether or not there exist successive "descent" change start points. Specifically, looking at change start point memory addresses stored in the change start point memory address region 123-3 and sign data related to them and stored in the sign data region 123-4, it is confirmed whether or not sign data corresponding to two successive change start point memory addresses among those change start point memory addresses indicate plus signs. Then, if so, larger change start point memory address among two successive change start point memory addresses and sign data (in fact, indicating a plus sign) corresponding to the larger change start point memory address are made relevant to a change start point which should be deleted. This is a process to delete an unnecessary rise edge which arises due to a lightness difference between a quiet zone near a scan end point and a subsequent peripheral white portion. Similarly, looking at change start point memory addresses stored in the change start point memory address region 123-3 and sign data related to them and stored in the sign data region 123-4, it is confirmed whether or not sign data corresponding to two successive change start point memory addresses among those change start point memory addresses indicate minus signs. Then, if so, smaller change start point memory address among two successive change start point memory addresses and sign data (in fact, indicating a minus sign) corresponding to the smaller change start point memory address are made relevant to a change start point which should be deleted. This is a process to delete an unnecessary descent edge which arises due to a lightness difference between a quiet zone near a scan start point and a preceding peripheral white portion.

(4) Data relating to the change start point which should be deleted are deleted (STEP 5). Specifically, change start memory addresses which are determined to be deleted and sign data related to them are respectively deleted from the change start point memory address region 123-3 and the sign data region 123-4.

For example, in a case where there are two successive values of change start point memory addresses corresponding to "rise" change start points in the change start point memory address region 123-3, the latter change start point memory address and the sign data corresponding to the latter address are deleted, and the former change start point memory address and the sign data corresponding to the former address are left. Similarly, in a case where there are two successive values of change start point memory addresses corresponding to "descent" change start points in the change start point memory address region 123-3, the former change start point memory address and the sign data corresponding to the former address are deleted, and the latter change start point memory address and the sign data corresponding to the latter address are left.

(5) A plurality of change end points respectively corresponding to all change start points left after deletion in above (4) are searched and determined (STEP 6 and STEP 7).

(5-1) In a case where the absolute value of the difference data between the input data themselves and the immediately before input data (the difference data which correspond to the immediately before input data and are stored in the difference data region 123-2) is equal to or more than a predetermined value and the absolute value of the difference between the input data themselves and the immediately after input data (the difference data which correspond to the input data themselves and are stored in the difference data region 123-2) is less than a predetermined value, a memory address where the input data themselves exist is determined as a change end point memory address corresponding to the change end point (STEP 601). The predetermined value as a threshold when searching the change end point may be the same as the predetermined value when searching the change start point or may be determined separately. A change end point which is firstly found from the position of each of change start points is the change end point corresponding to the each of change start points. Therefore, it is necessary only to find one change end point corresponding to each of change start points. Therefore, a process to delete part of change end points later is not necessary.

(5-2) The change end point memory address is stored in the change end point memory address region 123-5 in such a way to be associated with a corresponding change start point memory address (STEP 602).

(6) A median point between the change start point and the change end point is determined (STEP 8). Specifically, a memory address which is the closest to an average value between the change start point memory address corresponding to the change start point and the subsequent (corresponding) change end point memory address is determined as a median point memory address corresponding to the median point. Further, the median point memory address is stored into the median point memory address region 123-6.

Therefore, the change end point and the median point corresponding to the deleted change start point cannot be acquired. The change start point, the change end point and the median point can be treated as a set of points corresponding to one edge. Therefore, deleting the change start point is equal to not-generating an edge corresponding to the change start point. It can lead the same result to acquire the change end point and the median point without deleting the change start point and then delete the change start point, the change end point and the median point. In this case, this deletion can be regarded as deletion of the edge. Meanwhile, the term of "edge" is a generic term of a rise edge and a descent edge.

(7) A bar width between median points is calculated (STEP 9).

When calculating the bar width, a numerical value acquired by multiplying a difference between two median point memory addresses respectively corresponding to two mutually adjacent median points by a predetermined coefficient is determined as the bar width. Input data indicating a light reception strength are A/D-converted at predetermined intervals and stored at successive memory addresses in the input data region 123-1. Therefore, as noted above, the bar width can be calculated on the basis of the difference between two median point memory addresses respectively corresponding to two mutually adjacent median points.

(8) The bar width data and bar binarization level data are stored (STEP 10).

On one hand, a section from the "rise" change start point, through the change end point and the "descent" change start point, to the change end point is judged as a white bar section. On the other hand, a section from the "descent" change start point, through the change end point and the "rise" change start point, to the change end point is judged as a black bar section. Then, the bar binarization level data indicating whether each of sections corresponds to a white bar or a black bar and the bar width data are respectively stored in a bar binarization level data region 123-7 and a bar width data region 123-8 with mutually associating them. If the bar binarization level data and the bar width data are stored at a common address in the bar's appearance order, the address can be utilized for decode. Further, the bar's appearance order may be stored as data associated with the bar binarization level data and the bar width data. Further, the bar binarization level data and the bar width data may be associated with the change start point memory address. Further, the sign data may be used in place of the bar binarization level data.

The decoder 111 decodes the barcode on the basis of the bar binarization level data stored in the bar binarization level data region 123-7 and the bar width data stored in the bar width data region 123-8 in the memory 123.

In the flow of FIG. 5, the change end points are searched after searching the change start points. However, contrary to this, search for the change start points may be performed after searching the change end points. Further, it may be judged whether each data corresponds to the change start point or the change end point one after another from the first data. Also in these cases, the latter edge among two successive edges corresponding to "rise" and the former edge among two successive edges corresponding to "descent" are deleted.

FIG. 8 illustrates a reading analog signal wave shape corresponding to a portion where black bars and white bars are located successively in alternation. We explain about an operation of the preprocessor 125 in a case where an object of the preprocessor 125 is this signal wave shape. In FIG. 8, the reading analog signal wave shape is shown with a continuous line and sample points acquired by A/D conversion are shown with small rhomboids on the continuous line. In this figure, outlined circles indicate rise change start points, black circles indicate descent change start points, and black triangles indicate change end points corresponding to either of them.

In a second bump wave shape in FIG. 8, a memory address near an average value between the change start point memory address corresponding to a point A position and the change end point memory address corresponding to a point B position is determined as a median point memory address corresponding to a median point 1 between the point A and the point B. Similarly, a memory address near an average value between the change start point memory address corresponding to a point C position and the change end point memory address corresponding to a point D position is determined as a median point memory address corresponding to a median point 2 between the point C and the point D. Further, on the basis of a difference memory address as being a difference between the median point memory address corresponding to the median point 1 and the median point memory address corresponding to the median point 2, the distance between these median points is calculated as the bar width.

FIG. 9 illustrates the reading analog signal wave shape corresponding to a quiet zone and an adjacent portion thereof of a barcode. We explain about an operation of the preprocessor 125 in a case where an object of the preprocessor 124 is this signal wave shape. In more detail, FIG. 9 is a reading analog signal wave shape corresponding to a portion including the quiet zone before the barcode symbol in a case where the dark portion printed in the barcode is black, the bright portion included in the barcode is gray and the peripheral area around the barcode is white. As is clear from FIG. 9, the quiet zone and white bars are a bright portion and gray. Specifically, FIG. 9 illustrates a reading analog signal wave shape in a case where white color of the adjacent portion before the barcode is read near the scan start point, the quiet zone is read, and then the barcode symbol is read out.

Also in FIG. 9, an original wave shape is shown with a continuous line, and sample points acquired by A/D conversion are shown with small rhomboids on the continuous line just like in FIG. 8. In this figure, outlined circles indicate rise change start points, black circles indicate descent change start points, and black triangles indicate change end points corresponding to either of them.

Regarding FIG. 9, although detailed explanation about addresses is omitted, a point E is determined as the rise change start point, a point F as the start end point, a point G as the descent change start point, a point H as the change end point. Further, a median point 3 corresponding to the point E and the point F is determined as one median point and a median point 4 corresponding to the point G and the point H is determined as another median point. Here, in STEP 2 and STEP 3, a point X is detected as the descent change start point, but, in STEP 4 and STEP 5, the point X is deleted. Accordingly a point Y is not detected as the descent change end point. Further accordingly, a median point corresponding to the point X and the point Y is not calculated. Namely, because the bright portion of the barcode is gray and the adjacent portion of the barcode is white, although there exist the point X as the descent change start point and the point Y as the change end point, the descent change start point X and the descent change start G continues. Therefore, the former "descent" change start point X is deleted and the latter "descent" change start point G is maintained as it is. Namely, because the descent change start point X and the descent change start point G continues, the former "descent" change start point X among these is judged as a point which does not arise due to the barcode pattern and the latter "descent" change start point G is judged as a point which arises due to the barcode pattern. Consequently, the portion from the point E to the point H is recognized as one white bar and a distance between the median point 3 and the median point 4 is calculated as the bar width corresponding to the white bar.

FIG. 8 and FIG. 9 illustrate wave shapes where the change start point and the change end point are determined separately. However, depending on a signal form, the change start point and the change end point sometimes become the same point due to a large signal change rate in a comparison with sample intervals. In this case, the median point coincides with the change start point and the change end point.

Although part of below explanation overlaps with above explanation, FIG. 9 illustrates a wave shape and so forth in a case where the bright portion printed in the barcode is gray, the adjacent portion of the barcode label is white, and there is a black portion outside the adjacent portion. Namely, in FIG. 9, the point E corresponds to the black portion further outside the white portion around the barcode, and the region from the point F to the point X corresponds to the white portion around the barcode.

Contrary to this, in other cases, there does not exist the black region further outside the white portion around the barcode. In these cases, below process is performed in addition to processes illustrated in FIGS. 5, 6 and 7.

(A) In a case where, between the scan start point and the first descent change start point, there is not another change start point, the input data memory address of the scan start point is set as a memory address corresponding to all of the rise change start point, the change end point and the median point.

In a case where there is not the black region further outside the white portion around the barcode, the level of the scan start point becomes equal to the levels of the point F and the point X. Therefore, there is not the rise change start point between the scan start point and the first descent change point X. Therefore, this setting is performed.

For comparison, in a case of FIG. 9, because there is the rise change start point E between the scan start point and the first descent change point X, this setting is not performed.

(B) In a case where, between the scan end point and the final rise change start point, there is not another change start point, the scan end point data memory address is set as a memory address corresponding to all of the descent change start point, the change end point and the median point. This is a process that above (A) process is inverted horizontally.

Figure 10:
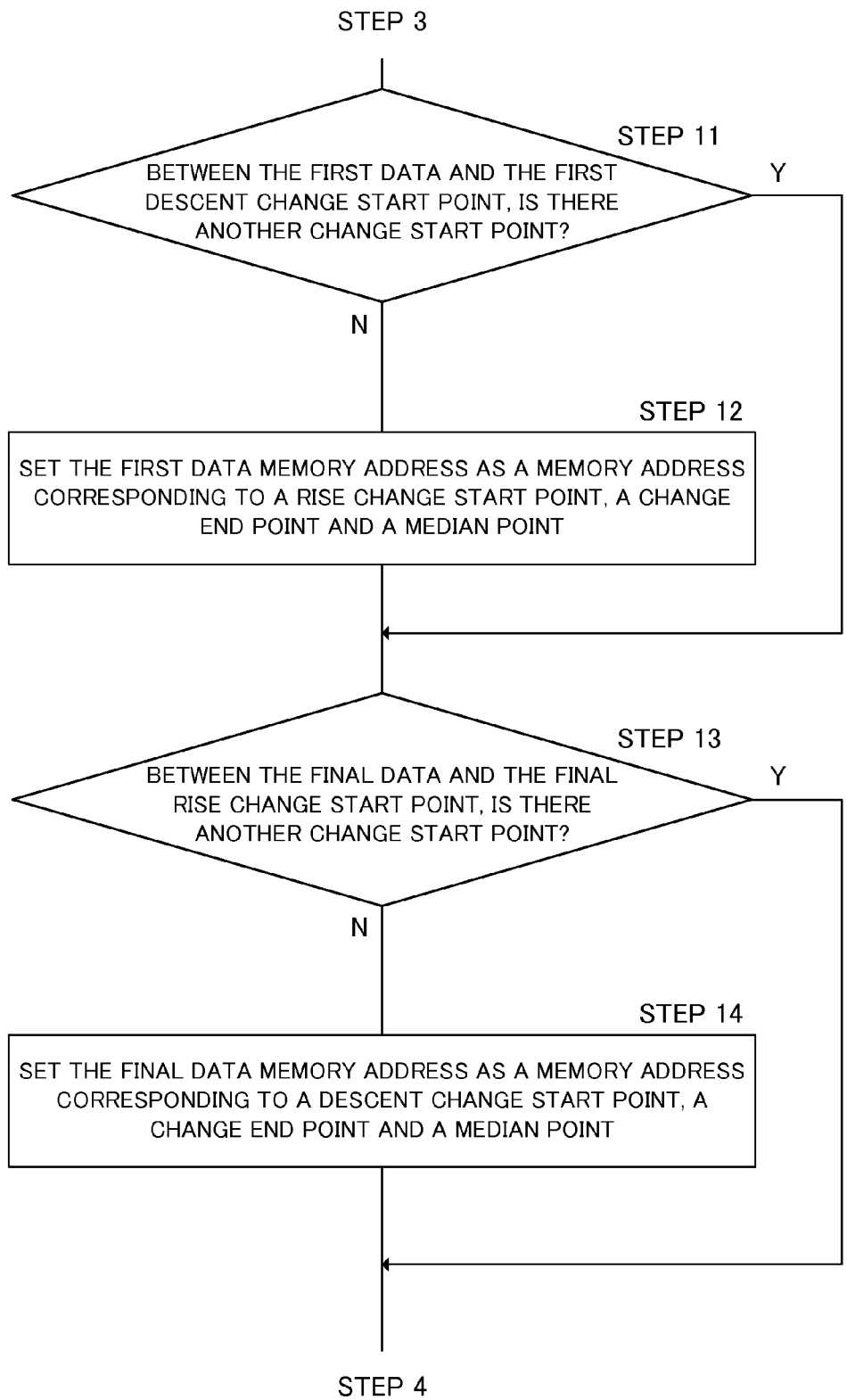
FIG. 10 A flowchart illustrates part of the process illustrated in FIG. 5 and a process added to the part.

Above processes (A) and (B) are performed between STEP 3 and STEP 4. Part of flowchart where above (A) is indicated by STEP 11 and STEP 12 and above (B) is indicated by STEP 13 and STEP 14 is illustrated in FIG. 10.

Meanwhile, as one example that the bright portion of the barcode is gray and the adjacent portion of the barcode is white, FIG. 9 shows an example that the barcode is scanned after white color of the adjacent portion of the barcode is scanned near the scan start point. Contrary to this, near the scan end point, white color around the barcode is scanned after the barcode is scanned. Therefore, near the scan end point, there are two successive rises which are a rise from the final dark portion of the barcode to the bright portion and a rise from the final bright portion of the barcode to the white portion around the barcode. As a process against this, a process to delete the latter "rise" change start point data and leave the former "rise" change start point data is performed.

Namely, explaining about these collectively, on detecting two successive edges having the same polarity, an edge which is closer to an end portion along the scan direction of the barcode is deleted as an unnecessary edge. Namely, an edge which is closer to an end portion of the scan is deleted as the unnecessary edge. "An edge which is closer to an end portion of the scan" means an edge closer to the end portion of the scan start side if the side is the scan start side end portion, and means an edge closer to the end portion of the scan end side if the side is the scan end side end portion.

Meanwhile, in above descriptions, a case where the bright portion of the barcode is gray, the dark portion of the barcode is black and the adjacent portions of the barcode are white is explained as an example. However, the present invention is not limited to this example, and is applicable for various cases where there is a level corresponding to the barcode bright portion between a level corresponding to the barcode adjacent portions and a level corresponding to the barcode dark portion looking at the reading analog signal wave shape. Therefore, the present invention is applicable to, for example, a case where similar features occur against a predetermined wave length light. Further, the present invention is applicable to a case where lightness inverts in contradiction to above example.

Meanwhile, the above-described barcode reader may be achieved by hardware, software, or combination thereof. Further, the barcode reading method executed by the above-described barcode reader may be achieved by hardware, software, or combination thereof. Here, the expression "achieved by software" means "achieved by a computer reading and executing a program".

A program may be stored using various types of a non-transitory computer readable medium and may be supplied to the computer. The non-transitory computer readable medium includes various types of a tangible storage medium. Examples of the non-transitory computer readable medium include a magnetic recording medium (e.g., flexible disk, magnetic tape, hard disk drive), a magnet-optical recording medium (e.g., magneto-optical disk), a CD-ROM (Read Only Memory), a CD-R, a CD-R/W, a semiconductor memory (e.g., mask ROM, a PROM (Programmable ROM), an EPROM (Erasable PROM), a flash ROM, and a RAM (random access memory)). Further, the program may be supplied to the computer by various types of a transitory computer readable medium as well. Examples of the transitory computer readable medium include an electric signal, an optical signal, and an electromagnetic wave. The transitory computer readable medium may supply the program to the computer via a wired channel such as an electric cable or an optical fiber, or via a wireless channel.

The present application is based on Japanese Patent Application No. 2012-271513 (filed on Dec. 12, 2012), and claims priority under the Paris convention to Japanese Patent Application No. 2012-271513. The entire contents of Japanese Patent Application No. 2012-271513 are incorporated by reference into this specification.

Although representative embodiments of the present invention have been described, it should be understood that various changes, substitutions, and alternatives may be made without departing from the spirit and scope of the claimed invention. The inventor's intention is that, even if the claims are amended in the course of application procedures, the equivalent scopes of the claimed invention should be maintained.

A part or entirety of the above-described embodiments may be described as in the following supplementary notes, but are not limited thereto.

(Supplementary Note 1)

A barcode reader for reading information indicated by a barcode on the basis of position information and polarity information on a plurality of edges included in a reading signal indicating a strength of a reflected light from the barcode on which a scan light is projected, the barcode reader comprising:
    an edge deleter configured to delete the position information and polarity information on an unnecessary edge which arises due to a difference between a strength of a reflected light from a quiet zone of the barcode and a strength of a reflected light from an adjacent portion of the quiet zone,
    wherein, on detecting two successive edges which have the same polarity, the deleter determines an edge which is closer to an end portion of a scan as the unnecessary edge and deletes the position information and polarity information on the unnecessary edge.

(Supplementary Note 2)

The barcode reader according to Supplementary note 1, wherein
    as the polarity of the edge, a polarity of a change start point corresponding to the edge is utilized.

(Supplementary Note 3)

The barcode reader according to Supplementary note 1 or 2, wherein
    in a case where there is no edge between a scan end portion and a first edge seen from the scan end portion, said first edge having a certain polarity, the scan end portion is treated as an edge having a polarity which is opposite to the certain polarity.

(Supplementary Note 4)

The barcode reader according to any one of Supplementary notes 1 to 3, wherein
    width data of each bar are determined on the basis of position information on a plurality of edges left after the edge deleter deletes position information and polarity information on the unnecessary edge, and binarization level data of each bar are determined on the basis of polarity information on the plurality of edges left after the edge deleter deletes position information and polarity information on the unnecessary edge.

(Supplementary Note 5)

The barcode reader according to Supplementary note 4, further comprising:
    a decoder configured to decode the information indicated by the barcode on the basis of the width data of the each bar and the binarization level data of the each bar.

(Supplementary Note 6)

The barcode reader according to any one of Supplementary notes 1 to 5, further comprising:
    an edge detector configured to detect a plurality of edges included in one scan on the basis of difference data per one scan respectively corresponding to input data representing the reading signal per one scan, the difference data representing a difference between mutually adjacent input data.

(Supplementary Note 7)

A barcode reading method for reading information indicated by a barcode on the basis of position information and polarity information on a plurality of edges included in a reading signal indicating a strength of a reflected light from the barcode on which a scan light is projected, the method comprising:
    deleting the position information and polarity information on an unnecessary edge which arises due to a difference between a strength of a reflected light from a quiet zone of the barcode and a strength of a reflected light from an adjacent portion of the quiet zone,
    wherein the deletion of the position information and polarity information on the unnecessary edge is performed by, on detecting two successive edges which have the same polarity, determining an edge which is closer to an end portion of a scan as the unnecessary edge and deleting the position information and the polarity information of the unnecessary edge.

(Supplementary Note 8)

The barcode reading method according to Supplementary note 7, wherein
as the polarity of the edge, a polarity of a change start point corresponding to the edge is utilized.

(Supplementary Note 9)

The barcode reading method according to Supplementary note 7 or 8, wherein
in a case where there is no edge between a scan end portion and a first edge seen from the scan end portion, said first edge having a certain polarity, the scan end portion is treated as an edge having a polarity which is opposite to the certain polarity.

(Supplementary Note 10)

The barcode reading method according to any one of Supplementary notes 7 to 9, wherein
width data of each bar are determined on the basis of position information on a plurality of edges left after the edge deleter deletes position information and polarity information on the unnecessary edge, and binarization level data of each bar are determined on the basis of polarity information on the plurality of edges left after the edge deleter deletes position information and polarity information on the unnecessary edge.

(Supplementary Note 11)

The barcode reading method according to Supplementary note 10, wherein
the information indicated by the barcode is decoded on the basis of the width data of the each bar and the binarization level data of the each bar.

(Supplementary Note 12)

The barcode reading method according to any one of Supplementary notes 7 to 11, wherein
a plurality of edges included in one scan is detected on the basis of difference data per one scan respectively corresponding to input data representing the reading signal per one scan, the difference data representing a difference between mutually adjacent input data.

(Supplementary Note 13)

A barcode reading program for causing a computer to function as a barcode reader for reading information indicated by a barcode on the basis of position information and polarity information on a plurality of edges included in a reading signal indicating a strength of a reflected light from the barcode on which a scan light is projected, the program causing the computer to function as:
an edge deleter configured to delete the position information and polarity information on an unnecessary edge which arises due to a difference between a strength of a reflected light from a quiet zone of the barcode and a strength of a reflected light from an adjacent portion of the quiet zone,
wherein, on detecting two successive edges which have the same polarity, the deleter determines an edge which is closer to an end portion of a scan as the unnecessary edge and deletes the position information and polarity information on the unnecessary edge.

(Supplementary Note 14)

The barcode reading program according to Supplementary note 13, the program further causing the computer to function in such a way to:
as the polarity of the edge, utilize a polarity of a change start point corresponding to the edge.

(Supplementary Note 15)

The barcode reading program according to Supplementary note 13 or 14, the program further causing the computer to function in such a way to:
in a case where there is no edge between a scan end portion and a first edge seen from the scan end portion, said first edge having a certain polarity, treat the scan end portion as an edge having a polarity which is opposite to the certain polarity.

(Supplementary Note 16)

The barcode reading program according to any one of Supplementary notes 13 to 15, the program further causing the computer to function in such a way to:
determine width data of each bar on the basis of position information on a plurality of edges left after the edge deleter deletes position information and polarity information on the unnecessary edge, and determine binarization level data of each bar on the basis of polarity information on the plurality of edges left after the edge deleter deletes position information and polarity information on the unnecessary edge.

(Supplementary Note 17)

The barcode reading program according to Supplementary notes 16, the program further causing the computer to function in such a way to:
decode the information indicated by the barcode on the basis of the width data of the each bar and the binarization level data of the each bar.

(Supplementary Note 18) The barcode reading program according to any one of Supplementary notes 13 to 17, the program further causing the computer to function in such a way to:
detect a plurality of edges included in one scan on the basis of difference data per one scan respectively corresponding to input data representing the reading signal per one scan, the difference data representing a difference between mutually adjacent input data.

INDUSTRIAL APPLICABILITY

The present invention is applicable for reading a barcode.

What is claimed is:

1. A barcode reader for reading information indicated by a barcode on the basis of position information and polarity information on a plurality of edges included in a reading signal indicating a strength of a reflected light from the barcode on which a scan light is projected, the barcode reader comprising:
an edge deleter configured to delete the position information and polarity information on an unnecessary edge which arises due to a difference between a strength of a reflected light from a quiet zone of the barcode and a strength of a reflected light from an adjacent portion of the quiet zone,
wherein, on detecting two successive edges which have the same polarity, the deleter determines an edge which is closer to an end portion of a scan as the unnecessary edge and deletes the position information and polarity information on the unnecessary edge.

2. The barcode reader according to claim 1, wherein
as the polarity of the edge, a polarity of a change start point corresponding to the edge is utilized.

3. The barcode reader according to claim 1, wherein
in a case where there is no edge between a scan end portion and a first edge seen from the scan end portion, said first edge having a specific polarity, the scan end portion is treated as an edge having a polarity which is opposite to the specific polarity.

4. The barcode reader according to claim 1, wherein width data of each bar are determined on the basis of position information on a plurality of edges left after the edge deleter deletes position information and polarity information on the unnecessary edge, and binarization level data of each bar are determined on the basis of polarity information on the plurality of edges left after the edge deleter deletes position information and polarity information on the unnecessary edge.

5. The barcode reader according to claim 4, further comprising:
a decoder configured to decode the information indicated by the barcode on the basis of the width data of the each bar and the binarization level data of the each bar.

6. The barcode reader according to claim 1, further comprising:
an edge detector configured to detect a plurality of edges included in one scan on the basis of a series of difference data which correspond to a series of input data corresponding to said one scan, said difference data representing a difference between mutually adjoining input data.

7. A barcode reading method for reading information indicated by a barcode on the basis of position information and polarity information on a plurality of edges included in a reading signal indicating a strength of a reflected light from the barcode on which a scan light is projected, the method comprising:
deleting the position information and polarity information on an unnecessary edge which arises due to a difference between a strength of a reflected light from a quiet zone of the barcode and a strength of a reflected light from an adjacent portion of the quiet zone,
wherein the deletion of the position information and polarity information on the unnecessary edge is performed by, on detecting two successive edges which have the same polarity, determining an edge which is closer to an end portion of a scan as the unnecessary edge and deleting the position information and the polarity information of the unnecessary edge.

8. A non-transitory computer-readable medium on which a program is recorded, said program, when executed, causing a computer to function as a barcode reader for reading information indicated by a barcode on the basis of position information and polarity information on a plurality of edges included in a reading signal indicating a strength of a reflected light from the barcode on which a scan light is projected, the program causing the computer to function as:
an edge deleter configured to delete the position information and polarity information on an unnecessary edge which arises due to a difference between a strength of a reflected light from a quiet zone of the barcode and a strength of a reflected light from an adjacent portion of the quiet zone,
wherein, on detecting two successive edges which have the same polarity, the deleter determines an edge which is closer to an end portion of a scan as the unnecessary edge and deletes the position information and polarity information on the unnecessary edge.

* * * * *